(12) United States Patent
Evans, V et al.

(10) Patent No.: US 9,525,764 B1
(45) Date of Patent: Dec. 20, 2016

(54) CO-MOLD FEATURES ON A CHASSIS SHELL OF A MOBILE DEVICE

(71) Applicant: Essential Products, Inc., Palo Alto, CA (US)

(72) Inventors: David John Evans, V, Palo Alto, CA (US); Xinrui Jiang, San Jose, CA (US); Andrew E. Rubin, Los Altos, CA (US); Matthew Hershenson, Los Altos, CA (US); Xiaoyu Miao, Palo Alto, CA (US); Joseph Anthony Tate, San Jose, CA (US); Jason Sean Gagne-Keats, Cupertino, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/140,461

(22) Filed: Apr. 27, 2016

Related U.S. Application Data

(60) Provisional application No. 62/249,130, filed on Oct. 30, 2015, provisional application No. 62/317,886, filed on Apr. 4, 2016.

(51) Int. Cl.
*H04M 1/02* (2006.01)
*H04M 1/23* (2006.01)

(52) U.S. Cl.
CPC ............. *H04M 1/026* (2013.01); *H04M 1/23* (2013.01); *H04M 2250/12* (2013.01)

(58) Field of Classification Search
CPC ............ H04B 1/3888; H01H 2229/044; H01H 2231/022; H04M 1/026; H04M 1/23
See application file for complete search history.

(56) References Cited

U.S. PATENT DOCUMENTS

| | | | |
|---|---|---|---|
| 8,218,306 B2 | 7/2012 | Lynch et al. | |
| 2004/0127267 A1 | 7/2004 | Wong et al. | |
| 2006/0121502 A1 | 6/2006 | Cain et al. | |
| 2009/0247243 A1 | 10/2009 | Chen et al. | |
| 2009/0323262 A1 | 12/2009 | Arita et al. | |
| 2010/0307904 A1 | 12/2010 | Yeh et al. | |
| 2011/0177848 A1 | 7/2011 | Tanabe et al. | |
| 2012/0160052 A1 | 6/2012 | Manahan et al. | |
| 2014/0168867 A1* | 6/2014 | Choi | H04M 1/236 361/679.01 |
| 2014/0273641 A1 | 9/2014 | Light et al. | |
| 2016/0021998 A1* | 1/2016 | Fathollahi | A45C 11/00 224/191 |

* cited by examiner

*Primary Examiner* — Nam Huynh
(74) *Attorney, Agent, or Firm* — Perkins Coie LLP

(57) ABSTRACT

A mobile device can include a unibody component (e.g. chassis shell) with at least a co-mold feature that isolates a contiguous portion of the unibody component from an outer portion of the unibody component. For example, the outer portion and the contiguous portion can be made of an electrically conductive material. The co-mold feature can be made of non-conductive material that electrically isolates the contiguous portion from the outer portion. The co-mold feature can be made by co-molding a resin material in a channel cut into a piece of metal and later exposing the cured resin material on two sides.

9 Claims, 8 Drawing Sheets

CO-MOLD FEATURES ON A CHASSIS SHELL OF A MOBILE DEVICE

CROSS-REFERENCE TO RELATED APPLICATION(S)

This application claims the benefits of U.S. Provisional Patent Application No. 62/249,130, entitled "MOBILE DEVICES AND MOBILE DEVICE ACCESSORIES," filed on Oct. 30, 2015, and U.S. Provisional Patent Application No. 62/317,886, entitled "CONTACT FEATURES ON A CHASSIS SHELL OF A MOBILE DEVICE," filed on Apr. 4, 2016, all of which are incorporated by reference herein in their entirety.

BACKGROUND

A conventional mobile device has various user interactive components, such as buttons and switches. A user interactive component of a mobile device generally is exposed on the exterior of the mobile device. During the conventional manufacturing process of a mobile device, a chassis shell of the mobile device is formed with openings. A user interactive component would be inserted through one of the openings and mechanically coupled to a sensor system that is coupled to a circuit board of the mobile device.

The interface between the opening in the chassis shell and a user interactive component exposes crevices for dust and other particles to accumulate. This increases the probability of a mechanical fault of the user interactive component. The potential misfit between the user interactive component and the opening of the chassis shell further complicates the manufacturing process and lowers the manufacturing yield rate.

SUMMARY

Various embodiments include a mobile device with one or more contact features on a chassis shell to serve as interactive components and to facilitate detection of user interaction events. The contact features can include unibody contact features. A unibody contact feature is an integral part of the chassis shell adapted to enable a sensor system to detect user interactions (e.g., touch events or gestures) occurring on the unibody contact feature or proximate to the unibody contact feature. The unibody contact features can include bumps, divots, co-mold features, cantilever features, transparent or semitransparent features, or any combination thereof.

A sensor system can be mounted on a side of the chassis shell directly opposite from a contact feature. In some embodiments, the sensor system is in direct contact with the chassis shell. For example, the sensor system can be an electrical sensor system (e.g., detects patterns in electrical characteristics on a contact feature), an optical sensor system (e.g., detects patterns in visual images of or through a contact feature), a mechanical force sensor system (e.g., detects patterns in physical force from the contact feature), or any combination thereof. The sensor system can include a resistive touch sensor and the unibody contact feature can include multiple electrically conductive portions exposed on an outer surface of the chassis shell separated by an electrically non-conductive portion of the outer surface. The sensor system can also include a capacitive touch sensor and the unibody contact feature can include an electrically conductive portion on the outer surface of the chassis shell separated by a dielectric layer underneath the outer surface.

Some embodiments of a mobile device include a circuit board having a processor thereon. The mobile device can include a chassis shell has an integral unibody including a co-mold loop feature surrounding a button. The co-mold loop feature can be non-conductive and bonded to the button and a passive part of the chassis shell. The passive part surrounds the co-mold loop feature. The co-mold loop feature can thereby isolate the button from the passive part of the chassis shell surrounding the co-mold loop feature. The button and the passive part of the chassis shell can be composed of a first material (e.g., metallic) different from a second material (e.g., non-metallic) composing the co-mold loop feature. The co-mold loop feature is exposed on both an exterior side and an interior side of the chassis shell. A sensor system is coupled to the circuit board and the button from the interior side of the chassis shell. The sensor system can be configured to detect a user interaction event based on sensor readings from the sensor system. The sensor system can be configured to register the user interaction event with the processor.

Some embodiments of a mobile device include a circuit board having a processor thereon and a chassis shell with one or more cut lines patterned thereon to form a cantilever feature. In some embodiments, a hinge region of the cantilever feature can be a cross section smaller than a partially floating region of the cantilever feature. The hinge region attaches the partially floating region to the rest of the chassis shell aside from the cantilever feature. The mobile device can have a sensor system, coupled to the circuit board, in contact with the cantilever feature. The cantilever feature is over a sensor of the sensor system. The cantilever feature can be in direct contact with or spaced apart from the sensor. For example, the sensor system can be a tactile sensor system or an optical sensor system. The sensor system can be configured to detect a user interaction event in response to detecting a preset pattern in sensor readings from one or more sensors of the sensor system. In response to detecting the user interaction event, the sensor system can send the user interaction event to the processor. The processor can then respond to the user interaction event.

Some embodiments includes a mobile device comprising a circuit board having a processor thereon and a chassis shell having an integral unibody including a co-mold loop feature surrounding a button. The co-mold loop feature can be integrally bonded to both the button and a passive part of the chassis shell surrounding the co-mold loop feature. The button can be composed of a first material different from a second material composing the co-mold loop feature. The mobile device can include a sensor system coupled to the circuit board and underneath the button from the interior side of the chassis shell. The sensor system can be configured to detect a user interaction event based on sensor readings from the sensor system and to register the user interaction event with the processor.

Some embodiments include a unibody component of a mobile device. The unibody component can include a contiguous piece of a first material, an outer piece comprised of at least the first material, and a co-mold feature made of a second material. The co-mold feature can surround the contiguous piece to thereby separate the contiguous piece from the outer piece. The co-mold loop feature can be integrally bonded to both the contiguous piece and the outer piece. The co-mold feature can be composed of a second material different from the first material. In one example, the first material is electrically conductive and the second material is substantially electrically insulating. In another example, the second material is electrically conductive and the first material is substantially electrically insulating. In one example, the unibody component is a chassis of the mobile device and the contiguous piece is an antenna for the mobile phone. In another example, the unibody component is a chassis of the mobile device and the contiguous piece is a button for the mobile phone.

Some embodiments include a method of manufacturing a unibody component of a mobile device. The method can include machining a channel partway into a first side of a metal piece in a pattern surrounding a contiguous portion of the metal piece; injecting resin into the channel; curing the resin; shaving off a layer of the metal piece on a second side opposite from the first side to expose the resin; and electrically connecting an inner portion of the metal piece surrounded by the resin to an electrical component of the mobile device. The cured resin can electrically isolate the inner portion from an outer portion just beyond the channel. In some embodiments, the method can further include cutting the metal piece into a plurality of pieces including cutting through at least two distinct locations of the channel. A display can be installed onto the metal piece to hermetically seal a space surrounded by the display and the metal piece.

Some embodiments of this disclosure have other aspects, elements, features, and steps in addition to or in place of what is described above. These potential additions and replacements are described throughout the rest of the specification.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Figure 1:
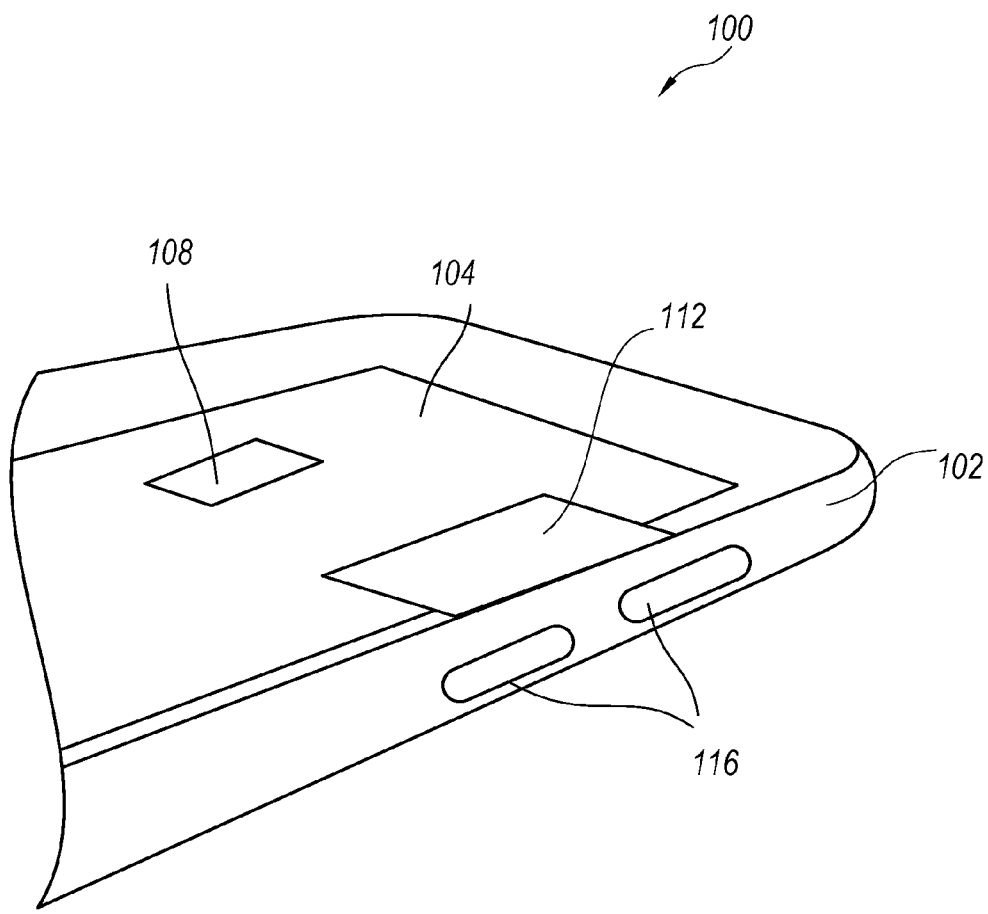
FIG. 1 is a perspective plan view of a mobile device, in accordance with various embodiments.

Turning now to the figures, FIG. 1 is a perspective plan view of a mobile device 100, in accordance with various embodiments. For purposes of illustration, a top cover (e.g., a display) of the mobile device 100 is not shown. A chassis shell 102 of the mobile device 100 forms an outer perimeter of the mobile device 100. The mobile device 100 includes a circuit board 104. The chassis shell 102 surrounds and encloses the circuit board 104. For example, a processor 108 is attached and electrically coupled to the circuit board 104. A sensor system 112 can also be attached to the circuit board 104. The sensor system 112 can be in contact with the chassis shell 102 to detect user interactions (e.g., touch events or gestures events) with one or more contact features 116 on the chassis shell 102.

In some embodiments, the sensor system 112 is an electrical sensor system (e.g., capacitive touch sensor system and/or resistive touch sensor system). For example, the electrical characteristics sensor system can include a capacitive sensor, a resistance sensor, a voltage sensor, a current sensor, or any combination thereof. In some embodiments, the sensor system 112 is a mechanical force sensor system. For example, the mechanical force sensor system can include a strain gauge, a pressure sensor, a force transducer, a vibration sensor, a microphone, or any combination thereof. In some embodiments, the sensor system 112 is an optical sensor system. For example, the optical sensor system can include a camera, an infrared optical sensor, an optical sensor for nonvisible spectrum, or any combination thereof. For example, while the contact features 116 are exposed on an exterior side of the chassis shell 102, one or more sensors can respectively be positioned on the inner side of the chassis shell 102 directly across from the contact features 116. For directional sensors, the sensors can be directed toward the contact features 116. The sensor system 112 can report and register a detected user interaction event to the processor 108.

In some embodiments where the sensor system 112 is an optical sensor system, the sensor system 112 can include a light source. For example, the light source can be a light source in the visible spectrum, infrared spectrum, or other electromagnetic radiofrequency spectrum. In some embodiments, the light source can be a light emitting diode (LED) or a laser.

Unlike conventional buttons that are separate components inserted into openings of a chassis shell, the chassis shell 102 includes one or more contact features 116 that represent locations where users can interact with the mobile device 100. The contact features 116 can be integral parts of the chassis shell 102, where these integral parts can be referred to as "unibody features" or "unibody contact features." In some embodiments, the contact features 116 are or include bumps or divots on the chassis shell 102 to inform the user (e.g., visually and/or tactilely) one or more locations on the chassis shell 102 where user interactions can be registered by the mobile device 100. In some embodiments, the contact features 116 are or include partial cutouts that enable regions of the chassis shell 102 that are capable of bending. The bending enables the sensor system 112 to detect physical force or movement. In some embodiments, the contact features 116 are or include transparent or semitransparent material to enable an optical sensor to visually detect patterns (e.g., movement patterns or image patterns) representing user interactions. FIGS. 2-5 represent different examples of a mobile device (e.g., the mobile device 100) having different contact features on its chassis shell.

Figure 2:
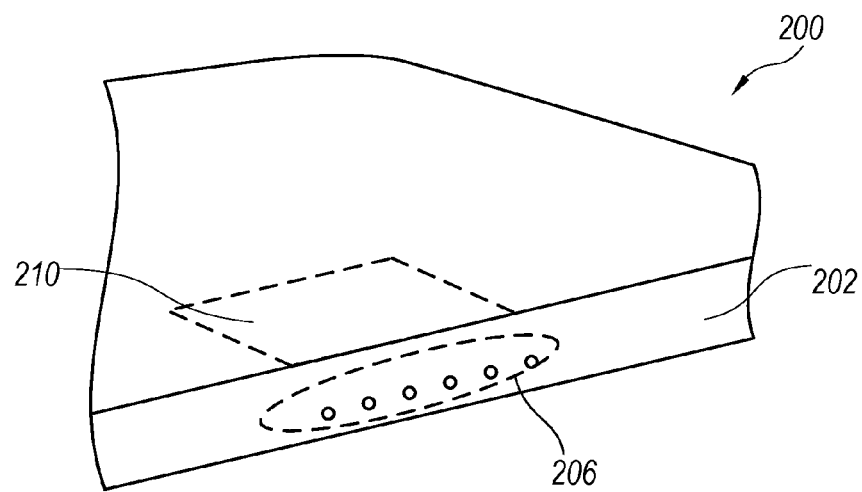
FIG. 2 is a block diagram of a mobile device having a chassis shell with unibody features, in accordance with various embodiments.

FIG. 2 is a block diagram of a mobile device 200 having a chassis shell 202 with unibody features 206, in accordance with various embodiments. The unibody features 206 can be bumps, divots, other concave features, other convex features, or any combination thereof. The unibody features 206 are integral to the chassis shell 202. In some embodiments, the chassis shell 202 is composed of a single rigid material (e.g., metal, plastic, carbon fiber, or other rigid material). In these embodiments, the unibody features 206 are composed of the same single rigid material. In some embodiments, the chassis shell 202 is composed of two or more materials. In these embodiments, the unibody features 206 are composed of the same material as a portion (e.g., a panel surface) of the chassis shell 202 that surrounds the unibody features 206.

Inside the mobile device 200 is an electrical sensor system 210 (shown in dashed lines). The electrical sensor system 210 can detect touch events based on changes in electrical characteristics (e.g., capacitance or resistance) of a load. In one example, the electrical sensor system 210 is a capacitive sensor system. The capacitive sensor system relies on capacitive coupling to detect a user interaction (e.g., a touch event). The capacitive sensor system can take into account human body capacitance as an input.

In another example, the electrical sensor system 210 is a resistive sensor system. The resistive sensor system can utilize flexible sheets coated with a resistive material and separated by a gap (e.g., an air gap or micro dots). The resistive sensor system can detect a touch event at a particular coordinate on the flexible sheets when electrical contact (e.g., caused by physical force from an external object) is made between the two sheets. The external object can be a finger, a stylus, a pen, other body parts, or other movable objects.

The electrical sensor system 210 can monitor electrical characteristic readings (e.g., capacitance variation or resistance/resistivity variation) at a region of the chassis shell 202 opposite from at least one of the unibody features 206. In some embodiments, the electrical sensor system 210 can determine, based on the electrical characteristic readings, when a touch event caused by an external object (e.g., human finger) occurred. For example, the electrical sensor system 210 can determine that a touch event occurred when the external object is in contact with at least one of the unibody features 206 or substantially in contact with (e.g., within 3 to 5 millimeter range from) one or more unibody features 206. In some embodiments, a logic unit (e.g., an adapter, an application-specific integrated circuit, a controller, or a processor) determines, based on the capacitive readings, when a touch event caused by a human finger occurred. In some embodiments, the logic unit is part of the electrical sensor system 210. In some embodiments, the logic unit is separate from the electrical sensor system 210 and a central processor of the mobile device 200. In some embodiments, the logic unit is a central processor of the mobile device 200.

In various embodiments, the mobile device 200 with the unibody features 206 can be waterproof and/or hermetically sealed. In these embodiments, the unibody features 206 on the chassis shell 202 does not include any holes and thus prevents exposure the electrical sensor system 210 to liquid substance outside of the chassis shell 202.

Figure 3A:
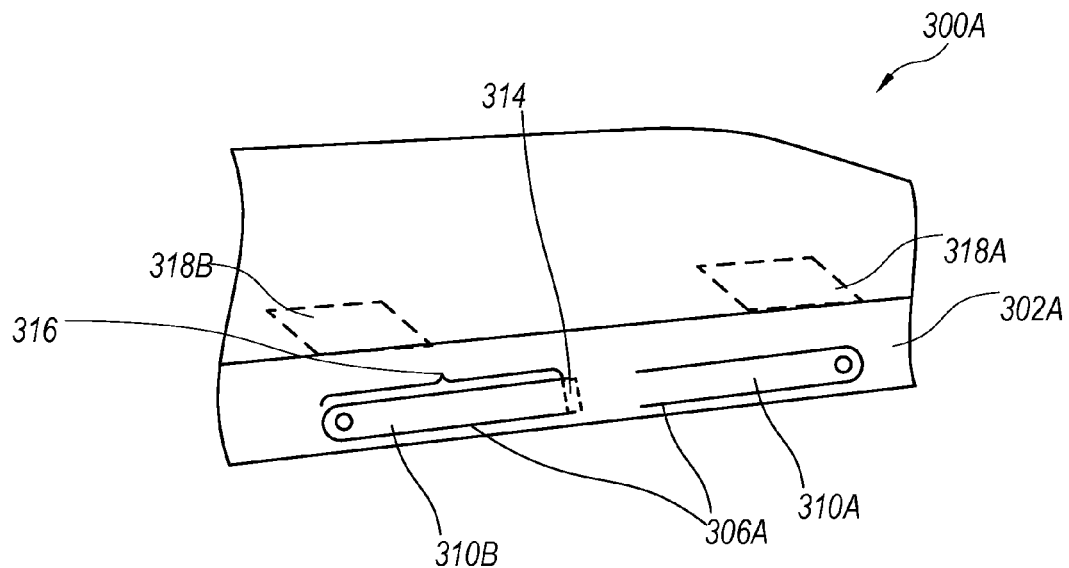
FIG. 3A is a perspective view of a first example of a mobile device having a chassis shell with one or more cut lines thereon, in accordance with various embodiments.

FIG. 3A is a perspective view of a first example of a mobile device 300A having a chassis shell 302A with one or more cut lines 306A thereon, in accordance with various embodiments. The cut lines 306A forms one or more cantilever features (e.g., cantilever feature 310A and a cantilever feature 310B, collectively as the "cantilever features 310"). For example, the cantilever features 310 can form leaf springs or flat springs. The cut lines 306A can include one or more straight lines and/or one or more curved lines. In several embodiments, the cut lines 306A do not form any loop. In some embodiments, at least one of the cut lines 306A forms a serpentine shape to produce one or more cantilever features shaped as scalloped protrusions. In these embodiments, the serpentine shape enables a single cut line to produce multiple cantilevered features that can serve as spring contact features (e.g., buttons). In some embodiments, at least one of the cut lines 306A forms a spiral shape (e.g., a circular spiral shape or a rectangular spiral shape) to produce at least a cantilevered feature with a corresponding spiral shape. In these embodiments, the spiral shape enables the cantilevered feature to flex deeper into the mobile device, and hence more accurately detect pressing of the cantilevered feature by a sensor system. Each of the cantilever features 310 can include at least a hinge portion 314 mechanically attaching a partially floating portion 316 to the chassis shell 302A. The partially floating portion 316 can be cantilevered from the hinge portion 314.

Inside the mobile device 300A is a sensor system 318 (e.g., including a sensor subsystem 318A (shown in dashed lines) for detecting user interactions at the cantilever feature 310A and a sensor subsystem 318B (shown in dashed lines) for detecting user interactions at the cantilever feature 310B, collectively the "sensor system 318"). In some embodiments, the sensor subsystem 318A is a mechanical force sensor system. In one example, the mechanical force sensor system is in contact with the partially floating portion 316 at the default/steady state of the cantilever feature 310A. When a user exerts a force against the partially floating portion 316, the partially floating portion 316, in turn, exerts a force against the mechanical force sensor system enabling the mechanical force sensor system to detect the user interaction. In another example, the mechanical force sensor system is slightly separated from the partially floating portion 316 at the default/steady state of the cantilever feature 310A. When a user exerts a force against the partially floating portion 316, the partially floating portion 316 moves to make contact with the mechanical force sensor system enabling the mechanical force sensor system to detect the user interaction.

In some embodiments, the sensor subsystem 318A is an optical sensor system. The optical sensor system can be spaced apart from the partially floating portion 316. The optical sensor system can direct its optical sensor toward the partially floating portion 316. In one example, when a user presses against the partially floating portion 316, the partially floating portion 316 moves toward the optical sensor. The optical sensor system can detect the movement visually, and register (e.g., with a processor) the movement as a user interaction on the cantilever feature 310A. In another example, when a user presses against the partially floating portion 316, the user covers up at least some of the cut lines 306A, and thus dimming the light received by the optical sensor system. In turn, the optical sensor system can register the dimming as a user interaction event with the cantilever feature 310A. In some embodiments, the optical sensor system can include a light source to facilitate the visual detection of a user interaction.

The sensor subsystem 318B can be implemented similarly to the sensor subsystem 318A. In some embodiments, the sensor subsystem 318A and the sensor subsystem 318B separately communicate with the processor (not shown) of the mobile device 300A. In some embodiments, the sensor subsystem 318A and the sensor subsystem 318B can consolidate and interprets data in a shared logic unit (not shown) of the sensor system 318 prior to communicating the detected user interactions with the processor of the mobile device 300A.

Figure 3B:
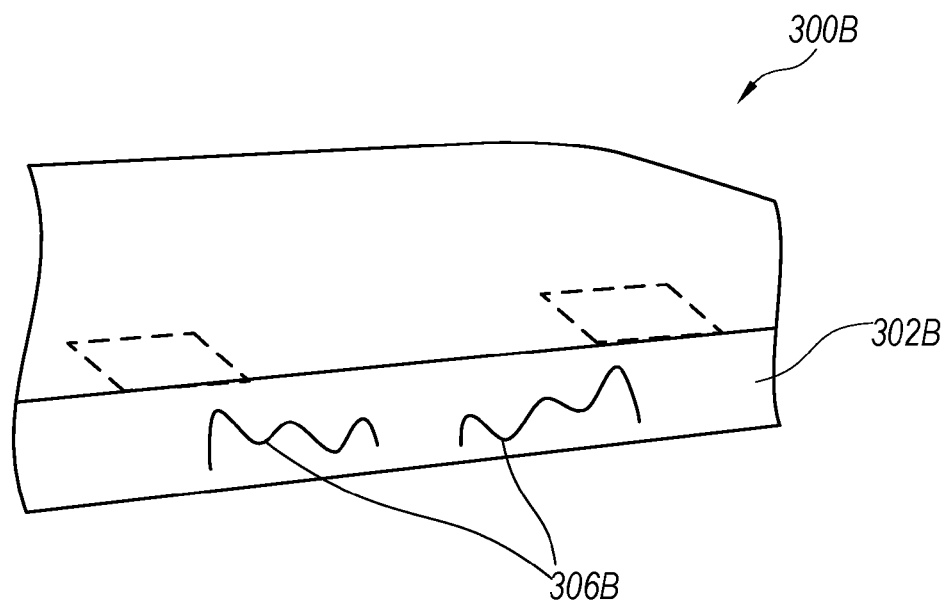
FIG. 3B is a perspective view of a second example of a mobile device having a chassis shell with one or more cut lines thereon, in accordance with various embodiments.

FIG. 3B is a perspective view of a second example of a mobile device 300B having a chassis shell 302B with one or more cut lines 306B thereon, in accordance with various embodiments. The cut lines 306B can include one or more serpentine shape cut lines that produce one or more scalloped cantilever features.

Figure 3C:
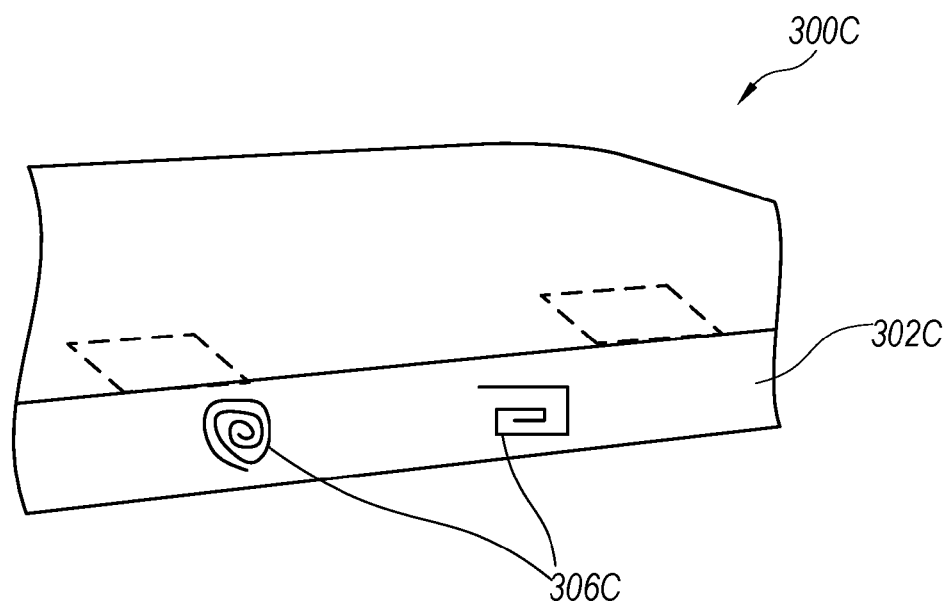
FIG. 3C is a perspective view of a third example of a mobile device having a chassis shell with one or more cut lines thereon, in accordance with various embodiments.

FIG. 3C is a perspective view of a third example of a mobile device 300C having a chassis shell 302C with one or more cut lines 306C thereon, in accordance with various embodiments. The cut lines 306C can include one or more spiral shape cut lines that produce spiral shape cantilever features.

Figure 4:
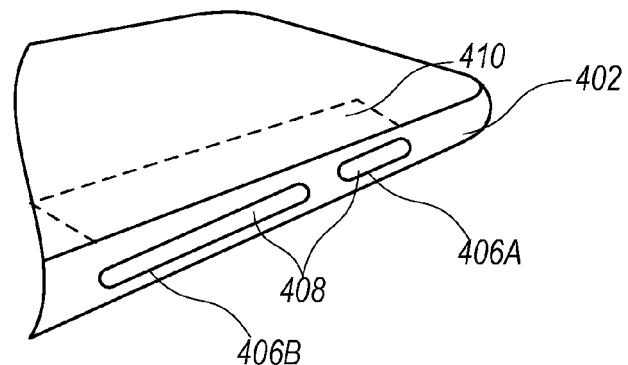
FIG. 4 is a perspective view of a mobile device having a chassis shell with co-mold features thereon, in accordance with various embodiments

FIG. 4 is a perspective view of a mobile device 400 having a chassis shell 402 with co-mold features (e.g., a co-mold feature 406A and a co-mold feature 406B, collectively as the "co-mold features 406") thereon, in accordance with various embodiments. In some embodiments, the co-mold features 406 are the unibody features 206 of FIG. 2. In some embodiments, the mobile device 400 can be made via the method 700 of FIG. 7. Co-mold is a type of molding over an existing part. For example, a first part can be placed into a mold, and a resin is injected into and around the first part to form a second part. A co-mold feature is a unibody contact feature integral to the chassis shell 402, where the co-mold feature is composed of one or more materials different from the material surrounding it.

In several embodiments, the chassis shell 402 is comprised of at least two material (e.g., metallic and nonmetallic). The co-mold features 406 can be nonmetallic. For example, the co-mold features 406 can include elastomer or plastic. The co-mold features 406 can be sandwiched between metallic parts of the chassis shell 402. The co-mold features 406 can be bonded (e.g., after curing a molded resin) to the metallic parts of the chassis shell 402 that the co-mold features 406 are in contact with, and thus making the chassis shell 402 an integral body. The co-mold features 406 can be exposed from the metallic parts of the chassis shell 402 on two opposite sides (e.g., an exterior and an interior of the chassis shell 402). The co-mold features 406 can be held together by all other sides (e.g., perpendicular sides from the exposed sides) by adjacent metallic parts of the chassis shell 402. In some embodiments, the co-mold features 406 are shaped in a loop or a ring that electrically isolate one or more metallic buttons 408 from the rest of the chassis shell 402. In other embodiments, the co-mold features 406 are non-looping features.

Inside of the mobile device 400 and the chassis shell 402 includes at least a touch sensor system 410 (shown in dashed lines), such as an electrical sensor system, a mechanical force sensor system/tactile sensor system, an optical sensor system, or any combination thereof. In some embodiments, the touch sensor system 410 is the electrical sensor system 210. The touch sensor system 410 can include a capacitive sensor, a resistive sensor, a mechanical force sensor, an optical sensor, or any combination thereof. The touch sensor system 410 can monitor sensor readings (e.g., capacitance variation, resistance/resistivity variation, optical image variation, mechanical force variation, or any combination thereof) at metallic buttons 408 and/or the co-mold features 406. For example, the touch sensor system 410 can determine that a touch event occurred when the external object is in contact or substantially in contact with at least one the metallic buttons 408 and/or the co-mold features 406. In some embodiments, the touch sensor system 410 is an optical sensor system. The material of the co-mold features 406 can be semi-transparent or transparent to enable the optical sensor system to detect a touch event or a gesture event occurring beyond the co-mold features 406.

In some embodiments, a logic unit (e.g., an adapter, an application-specific integrated circuit, a controller, or a processor) determines, based on the sensor readings, when a touch event caused occurred. In some embodiments, the logic unit is part of the touch sensor system 410. In some embodiments, the logic unit is outside of the touch sensor system 410.

Figure 5:
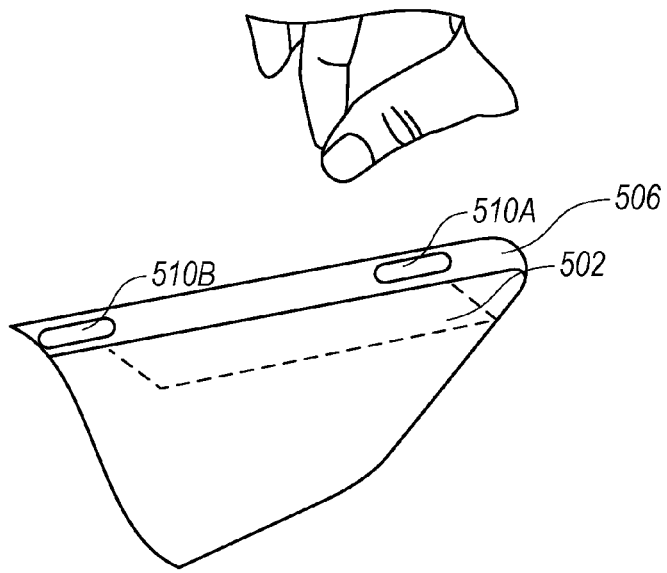
FIG. 5 is a perspective view of a mobile device having an optical sensor system capable of visually detecting user interactions proximate to the mobile device, in accordance with various embodiments.

FIG. 5 is a perspective view of a mobile device 500 having an optical sensor system 502 (shown in dashed lines) capable of visually detecting user interactions proximate to the mobile device, in accordance with various embodiments. In some embodiments, the mobile device 500 is the mobile device 400 of FIG. 4. The mobile device 500 includes a chassis shell 506 having one or more non-opaque features (e.g., a non-opaque feature 510A and a non-opaque feature 510B, collectively as the "non-opaque features 510") thereon. The non-opaque features can be transparent or at least partially transparent to enables the optical sensor system 502 to detect visual movements therethrough. In some embodiments, the non-opaque features 510 are unibody features integral to the chassis shell 506. In some embodiments, the non-opaque features 510 are inserts through the openings of the chassis shell 506.

The optical sensor system 502 detects images of one or more objects outside of the mobile device 500. For example, unlike some embodiments of the touch sensor system 410 that utilizes an optical sensor, the optical sensor system 502 detects images through the non-opaque features 510 instead of the images of the non-opaque features 510. In some embodiments, the optical sensor system 502 determines a user interaction event based on image analysis of one or more captured images. In some embodiments, the optical sensor system 502 determines a user interaction event based on video analysis of a sequence of one or more images captured by the optical sensor system 502. For example, the user interaction event can be a touch event or a user gesture event. The optical sensor system 502 can register the touch events with a processor (not shown). In some embodiments, the optical sensor system 502 can detect images in the visual spectrum. In some embodiments, the optical sensor system 502 can detect images outside of the visual spectrum, such as infrared spectrum.

In some embodiments, the optical sensor system 502 includes a light source. For example, the optical sensor system 502 can include an infrared light emitter, a light-emitting diode, a laser, or any combination thereof.

Figure 6:
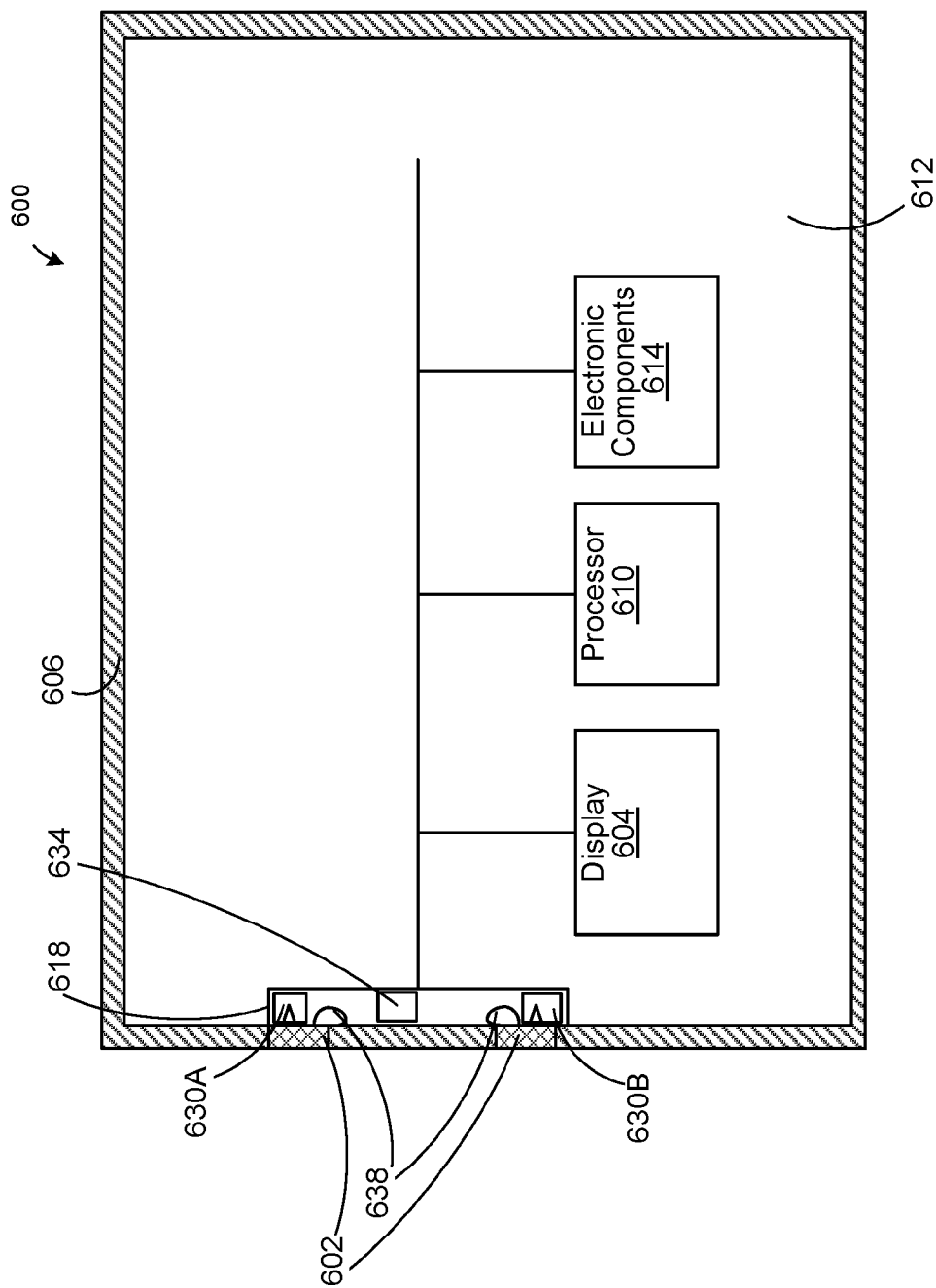
FIG. 6 is a block diagram illustrating a mobile device with an interactive component, in accordance with various embodiments.

FIG. 6 is a block diagram illustrating a mobile device 600 with a contact feature 602, in accordance with various embodiments. The mobile device 600 can be the mobile device 100, the mobile device 200, the mobile device 300A, the mobile device 400, the mobile device 500, or any combination thereof. The mobile device 600 can include a display 604, a chassis shell 606, a processor 610, a circuit board 612 (e.g., a circuit board), one or more electronic components 614 (e.g., including a sensor system 618), or any combination thereof. For example, the sensor system 618 can be an electrical characteristic sensor system, an optical sensor system, a mechanical force sensor system (e.g., a tactile sensor system), or any combination thereof.

The chassis shell 606 can be adapted to protect the electronic components 614 and the processor 610. The circuit board 612 can hold and support the processor 610 and the electronic components 614. In some embodiments, the circuit board 612 provides electrical interconnection for the electronic components 614. The display 604 can be attached over the circuit board 612. The chassis shell 606 can be adapted to form an exterior of the mobile device 600 and to protect the electronic components 614 therein. The chassis shell 606 can expose at least part of the display 604. In some embodiments, the display 604 is a touchscreen. The chassis shell 606 and the exposed portion of the display 604 can form a substantially sealed exterior of the mobile device 600.

The chassis shell 606 includes the contact feature 602. In some embodiments, the chassis shell 606 includes multiple contact features. In some embodiments, the contact feature 602 is unibody feature (e.g., one of the unibody features 206) that is mechanically integral to the rest of the chassis shell 606. In one example, the contact feature 602 includes one or more bumps or divots on the chassis shell 606. In some embodiments, the contact feature 602 is a cantilever feature (e.g., one of the cantilever features 310). In some embodiments, the contact feature 602 includes a co-mold feature (e.g., one of the co-mold features 406). In some embodiments, the contact feature 602 includes non-opaque features (e.g., one of non-opaque features 510).

In some embodiments, the sensor system 618 monitors raw data from inside the chassis shell 606. One or more sensors (e.g., a sensor 630A and a sensor 630B, collectively as the "sensors 630") can be directed toward or in contact with the contact feature 602. In some embodiments, a logic unit 634 of the sensor system 618 identifies user interaction events by detecting patterns in the raw data. Upon identifying a user interaction event, the logic unit 634 can send an interrupt message, indicating the user interaction event, to an operating system implemented by the processor 610.

In some embodiments, the sensor system 618 sends the raw data to the processor 610. The processor 610 can implement an operating system. In these embodiments, the processor 610 (e.g., a driver implemented by the processor 610) identifies a user interaction event by detecting patterns in the raw data. The processor 610 can then issue an interrupt message to the operating system to indicate that the user interaction event has occurred.

In some embodiments, the sensor system 618 includes other devices to facilitate user interactions with the mobile device 100. For example, the sensor system 618 can include one or more feedback devices 638, such as a piezo-electric feedback device, a transducer feedback device, a vibration motor, or any combination thereof. The feedback devices 638 can generate a mechanical force on the chassis shell 606 to indicate that the sensor system 618 has registered a user interaction on the contact feature 602. The mechanical force can be localized around the contact feature 602 on which the user interaction is registered.

Each of the components (e.g. the mechanical and/or electronic components) associated with the mobile device 600 may operate individually and independently of other components of the mobile device 600. Some or all of the components may be mechanically attached to or coupled to one another to form a single apparatus. Electronic components can be coupled through one or more communication channels (e.g., wireless or wired channel) to coordinate their operations. Some or all of the components may be combined as one component. A single component may be divided into sub-components, each sub-component performing separate function or functions of the single component. The mobile device 600 described may include additional, fewer, or different components (e.g., mechanical, electrical, functional, logical, and/or decorative components) for various applications.

Figure 7:
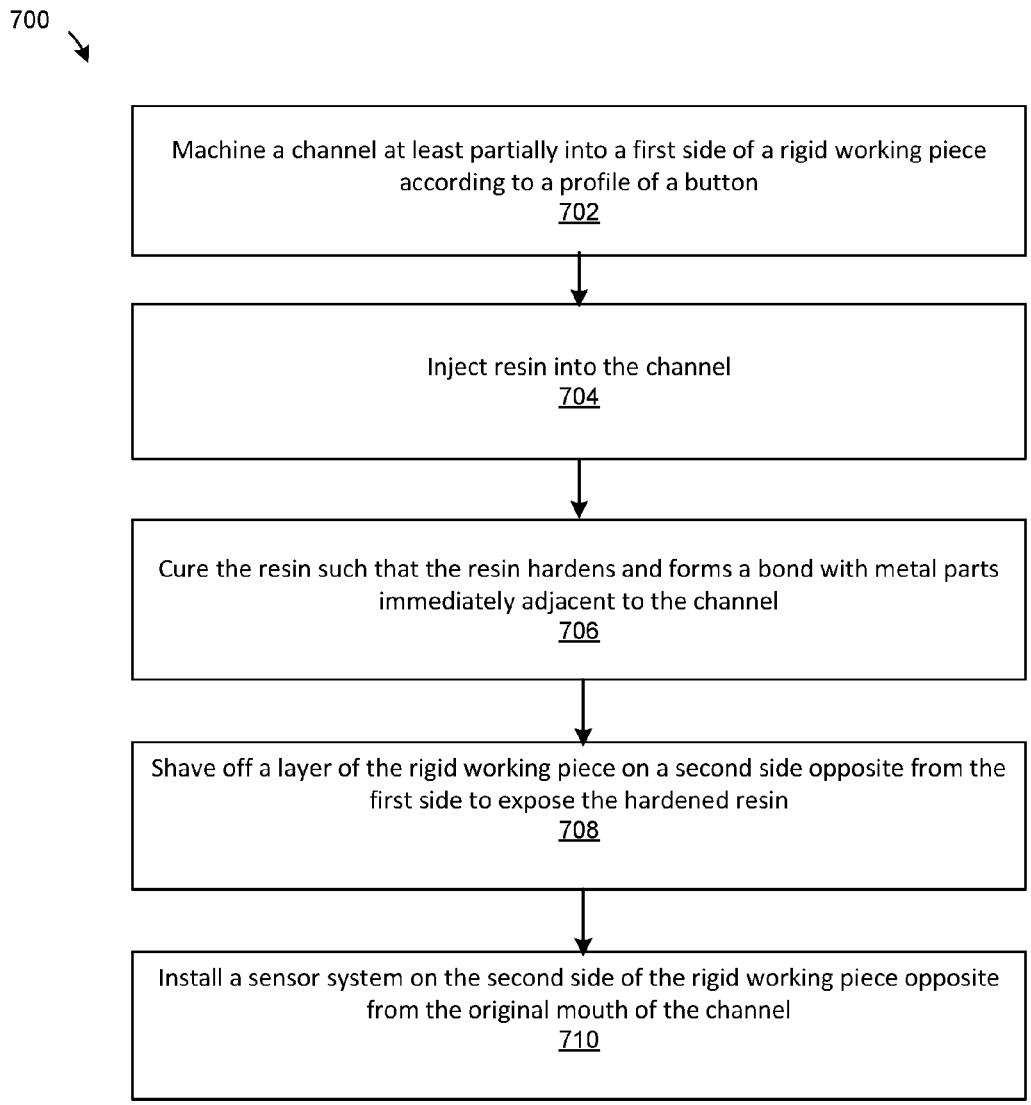
FIG. 7 is a flowchart illustrating a method of manufacturing a mobile device with a co-mold feature, in accordance with various embodiments.
Figure 8A:
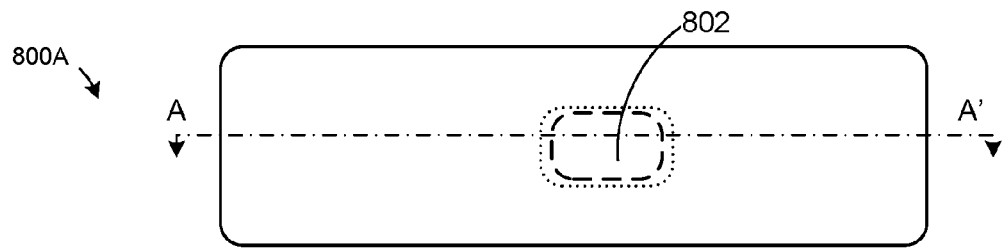
FIG. 8A is a top view of a rigid working piece to be formed into a chassis shell, in accordance with various embodiments.
Figure 8B:
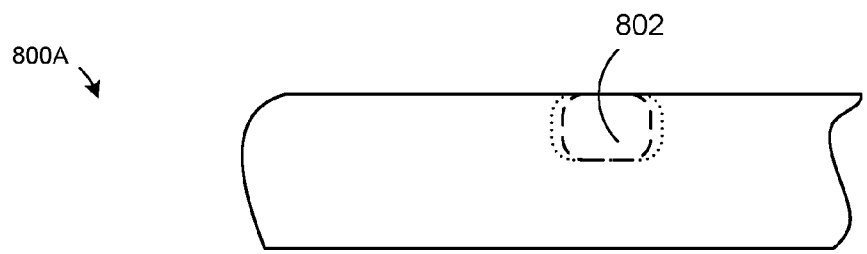
FIG. 8B is a cross-sectional side view of the rigid working piece of FIG. 8A along lines A-A' of FIG. 8A.

FIG. 7 is a flowchart illustrating a method 700 of manufacturing a mobile device (e.g., the mobile device 400) with a co-mold feature, in accordance with various embodiments. FIGS. 8A-8F illustrate cross-sections of a rigid working piece undergoing the manufacturing method 700 of FIG. 7, in accordance with various embodiments. For example, FIG. 8A is a top view of a rigid working piece 800A to be formed into a chassis shell, in accordance with various embodiments. A target region 802 (shown in dashed lines) illustrates the intended region where a metallic button surrounded by a co-mold feature is to form via the method 700. The area bounded by the dashed lines illustrates the intended region of the metallic button. The area bounded between the dashed lines and the dotted lines illustrate the intended region of the co-mold feature. FIG. 8B is a cross-sectional side view of the rigid working piece 800A of FIG. 8A along lines A-A' of FIG. 8A. The rigid working piece 800A can be comprised of metallic material, non-metallic material, or a combination thereof. The rigid working piece 800A can be in any state of completeness, from a raw block of material to a nearly finished shape of the chassis shell.

Figure 8C:
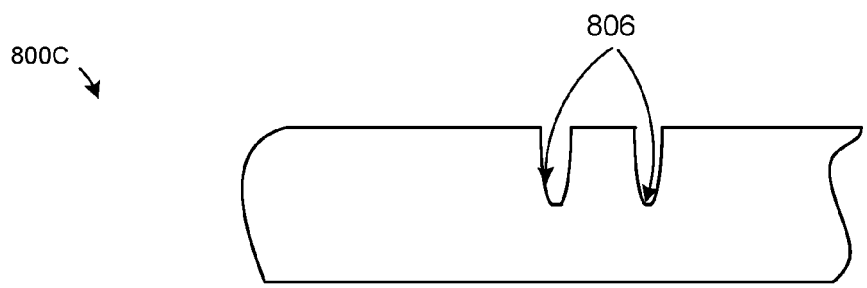
FIG. 8C is a cross-sectional view of the rigid working piece along lines A-A' of FIG. 8A after machining a channel therein.

At step 702, a manufacturer can machine a channel at least partially into a first side of a rigid working piece according to a profile of a button. For example, the manufacturer can use a laser machine or a computerized numeric control (CNC) mill to form the channel. FIG. 8C is a cross-sectional view of a rigid working piece 800C along lines A-A' of FIG. 8A after machining a channel 806 in the rigid working piece 800A of FIG. 8A. The channel 806 is formed as a result of step 702.

Figure 8D:
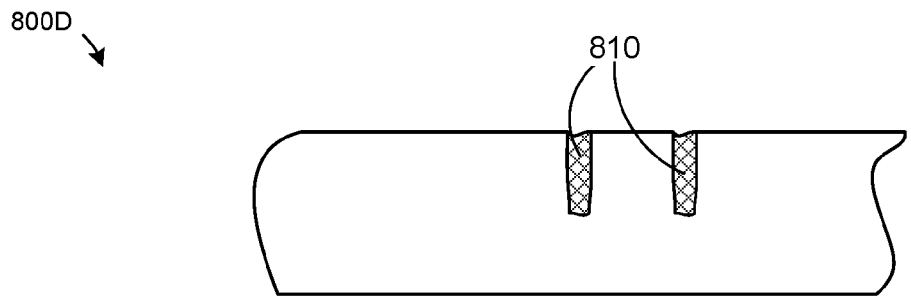
FIG. 8D is a cross-sectional view of the rigid working piece along lines A-A' of FIG. 8A after injecting resin into the channel.

At step 704, the manufacturer can inject resin into the channel. For example, the resin can be a nonconductive material (e.g., plastic, epoxy, elastomer, etc.). The resin can be anodized metal oxide or ceramitized metal. In some embodiments, resin is injected into the channel until the height of the resin aligns with the top surface of the first side of the rigid working piece. The resin can be an adhesive material. FIG. 8D is a cross-sectional view of the rigid working piece 800D along lines A-A' of FIG. 8A after injecting resin into the channel 806 of the rigid working piece 800C (e.g., after step 704). A co-mold feature 810 can formed within the space of the channel 806. Step 704 can be performed as part of a co-mold process (i.e., any type of molding over an existing part). In one example, the co-mold process can be an over mold process. In an over mold process, a mold with a single cavity is used. The rigid working piece 800C would be placed into the single cavity of the mold, and the resin is injected over the rigid working piece 800C within the single cavity. In another example, the co-mold process can be a double shot process. A mold with two cavities is used in the double shot process. A first cavity of the mold is used to manufacture the rigid working piece 800A (e.g., before step 702), and a second cavity of the mold is used to inject the resin into the channel of the rigid working piece 800C after the channel is formed. In that example, the rigid working piece 800A can be formed from a plastic material.

Figure 8E:
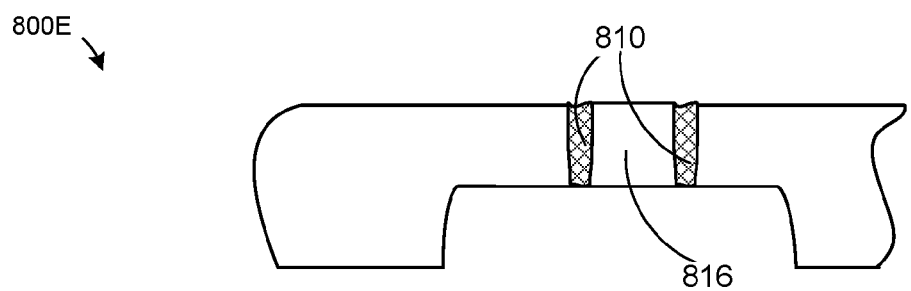
FIG. 8E is a cross-sectional view of a chassis shell formed from the rigid working piece along lines A-A' of FIG. 8A after shaving off a layer of the rigid working piece.

At step 706, the manufacturer can cure the resin such that the resin hardens and forms a bond with metal parts immediately adjacent to the channel. At step 708, the manufacturer can shave off a layer of the rigid working piece on a second side opposite from the first side to expose the hardened resin. For example, step 708 can be performed by a subtractive process, such as CNC machining, grinding, electrical discharge machining (EDM), punching, laser cutting, waterjet cutting, or any combination thereof. In some embodiments, the shaving of the layer is localized within a region opposite from the channel. FIG. 8E is a cross-sectional view of a chassis shell 800E formed from the rigid working piece 800D along lines A-A' of FIG. 8A after shaving off a layer of the rigid working piece 800D (e.g., after step 708). Although FIG. 8E illustrates the result of a localized shaving of the second side of the rigid working piece 800D, in other embodiments, the entire second side of the rigid working piece 800D can be shaven off. In several embodiments, the rigid working piece 800D is formed into the chassis shell 800E of a mobile device after step 708.

In some embodiments, the co-mold feature 810 takes the form of a ring around a button profile. In these embodiments, the co-mold feature 810 holds an inner metal button 816 and the rest of the chassis shell together while electrically isolating the inner metal button 816. In some embodiments, there is no inner metal button and the co-mold feature 810 takes the form of a button profile (e.g., instead of a loop or ring shape). In these embodiments, the co-mold feature 810 is attached to the rest of the chassis shell and acts as a button (e.g., tactile, optical, resistive, and/or capacitive button) for the mobile device.

Figure 8F:
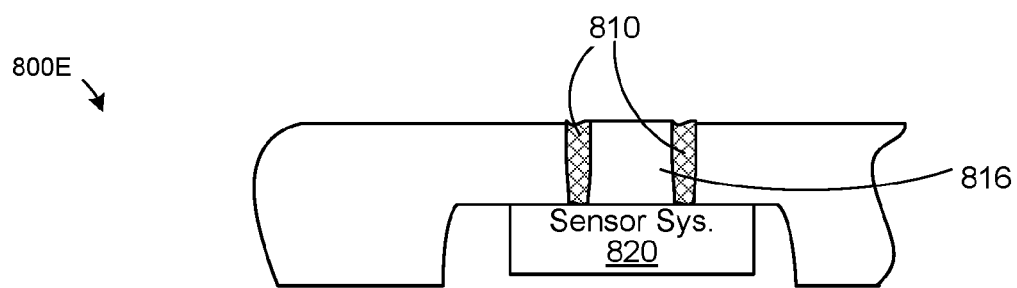
FIG. 8F is a cross-sectional view of the chassis shell along lines A-A' of FIG. 8A after a sensor system is installed.

At step 710, the manufacturer can install a sensor system 820 (e.g., a capacitive sensor system, a resistive sensor system, an optical sensor system, or any combination thereof) on the second side (e.g., opposite from the original mouth of the channel) of the rigid working piece. The sensor system can be used to detect touch events. FIG. 8F is a cross-sectional view of the chassis shell 800E along lines A-A' after a sensor system 820 is installed. In some embodiments, the sensor system 820 is directly attached to the chassis shell 800E. In some embodiments, the sensor system 820 is attached to a support frame, which is mechanically bound within the chassis shell formed from the chassis shell 800E. In various embodiments, the sensor system 820 can include sensors directed at and/or in contact with the inner metal button 816 and/or the co-mold feature 810.

In various embodiments, the manufacturing process of the method 700 is applicable to construct a hermetically sealed structure (e.g., the chassis shell 800E) with both an electrically conductive portion and an electrically nonconductive portion. This hermetically sealed structure can be the chassis shell of a mobile device. The conductive portion can be a contact feature, representing a button, or other functional piece usable by one or more electrical systems of the mobile device. For example, the conductive portion can be metallic, carbon fiber, etc., or any combination thereof, and the non-conductive portion can be ceramic, glass, silicone, etc., or any combination thereof.

While processes or blocks are presented in a given order in this disclosure, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times.

Some embodiments of the disclosure have other aspects, elements, features, and steps in addition to or in place of what is described above. These potential additions and replacements are described throughout the rest of the specification. Reference in this specification to "various embodiments," "several embodiments," "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments.

What is claimed is:

1. A method of manufacturing a chassis of a mobile device, comprising:
    machining a channel partway into a first side of a metal piece in a pattern surrounding a contiguous portion of the metal piece;
    injecting resin into the channel;
    curing the resin;
    shaving off a layer of the metal piece on a second side opposite from the first side to expose the resin; and
    electrically connecting an inner portion of the metal piece surrounded by the resin to an electrical component of the mobile device, wherein the resin electrically isolates the inner portion.

2. The method of claim 1, wherein injecting the resin includes injecting the resin into the channel until the resin fill up to a top surface of the metal piece at a mouth of the channel.

3. The method of claim 1, wherein the resin is an adhesive and wherein, after curing the resin, the resin hardens and creates a bond with immediately adjacent metallic structures in the metal piece.

4. The method of claim 1, wherein the resin is an adhesive and wherein, after curing the resin, the resin hardens and creates a bond with immediately adjacent metallic structures in the metal piece.

5. The method of claim 1, wherein said shaving off the layer includes shaving off only a localized region on the second side opposite from the resin in the channel.

6. The method of claim 1, further comprising installing a sensor on the second side of the metal piece to detect human finger touch events.

7. The method of claim 1, wherein the channel is a loop around the contiguous portion.

8. The method of claim 1, further comprising cutting the metal piece into a plurality of pieces, wherein said cutting includes cutting through at least two distinct locations of the channel.

9. The method of claim 1, further comprising installing a display onto the metal piece to hermetically seal a space surrounded by the display and the metal piece.

* * * * *